(12) United States Patent
Ryu et al.

(10) Patent No.: US 10,272,408 B1
(45) Date of Patent: Apr. 30, 2019

(54) FLUIDIZED BED SOLID CIRCULATION SYSTEM USING PRESSURE AND DENSITY DIFFERENCE, FLUIDIZED BED REACTION SYSTEM HAVING THE SAME AND SOLID CIRCULATION METHOD

(71) Applicant: KOREA INSITUTE OF ENERGY RESEARCH, Daejeon (KR)

(72) Inventors: Ho-jung Ryu, Daejeon (KR); Doyeon Lee, Daejeon (KR); Gyoung-tae Jin, Daejeon (KR); Chang-keun Yi, Daejeon (KR); Dowon Shun, Daejeon (KR); Jaehyeon Park, Daejeon (KR); Dal-hee Bae, Sejong-si (KR); Sung-ho Jo, Daejeon (KR); Seung-yong Lee, Daejeon (KR); Young Cheol Park, Daejeon (KR); Jong-ho Moon, Seoul (KR); Dong-ho Lee, Daejeon (KR)

(73) Assignee: Korea Institute of Energy Research, Daejeon (KR)

( * ) Notice: Subject to any disclaimer, the term of this patent is extended or adjusted under 35 U.S.C. 154(b) by 0 days.

(21) Appl. No.: 15/902,341

(22) Filed: Feb. 22, 2018

(30) Foreign Application Priority Data

Dec. 21, 2017 (KR) ........................ 10-2017-0177435

(51) Int. Cl.
   *B01J 8/26* (2006.01)
   *B01J 8/18* (2006.01)
   *B01J 8/00* (2006.01)

(52) U.S. Cl.
   CPC .............. *B01J 8/26* (2013.01); *B01J 8/0015* (2013.01); *B01J 8/0055* (2013.01); *B01J 8/1809* (2013.01); *B01J 8/1818* (2013.01); *B01J 2208/00539* (2013.01); *B01J 2208/00752* (2013.01); *B01J 2208/00761* (2013.01)

(58) Field of Classification Search
   CPC . B01J 8/26; B01J 8/0015; B01J 8/0055; B01J 8/1809; B01J 8/1818
   USPC ........................................................ 422/142
   See application file for complete search history.

(56) References Cited

U.S. PATENT DOCUMENTS

| 9,192,904 | B1 * | 11/2015 | Ryu | ........................ B01J 8/002 |
| 2013/0055936 | A1 * | 3/2013 | Vimalchand | ........... B01J 8/0055 110/245 |

(Continued)

FOREIGN PATENT DOCUMENTS

| KR | 10-0870756 B1 | 11/2008 |
| KR | 10-1214115 B1 | 12/2012 |
| KR | 10-1573297 B1 | 12/2015 |

*Primary Examiner* — Huy Tram Nguyen
(74) *Attorney, Agent, or Firm* — Rabin & Berdo, P.C.

(57) ABSTRACT

Disclosed is provided to overcome problems of conventional methods using each of a solid discharge nozzle and a screw conveyer. According to one exemplary embodiment of the present invention, a fluidized bed system is provided to circulate solids using pressure and density difference. More particularly, a fluidized solid circulation system using pressure and density difference is characterized by comprising: a first fluidized bed reactor; a second fluidized bed reactor; a first cyclone; a second cyclone; a first pressure control valve; a second pressure control valve; a lower loop seal; an upper loop seal; and a control part, thereby circulating the solids between the first fluidized bed reactor and the second fluidized bed reactor.

15 Claims, 8 Drawing Sheets

(56) References Cited

U.S. PATENT DOCUMENTS

2014/0034134 A1* 2/2014 Fan .................. B01J 8/0055
                                                    137/1
2016/0273761 A1* 9/2016 Hoteit ................ F23C 10/01

* cited by examiner

FLUIDIZED BED SOLID CIRCULATION SYSTEM USING PRESSURE AND DENSITY DIFFERENCE, FLUIDIZED BED REACTION SYSTEM HAVING THE SAME AND SOLID CIRCULATION METHOD

CROSS-REFERENCE TO RELATED APPLICATION

The present application claims priority to and the benefit of Korean Patent Application No. 10-2017-0177435 filed in the Korean intellectual Property Office on Dec. 21, 2017, the entire contents of which are incorporated herein by reference.

BACKGROUND

Technical Field

The present invention relates to a fluidized bed circulation system using pressure and density difference, a fluidized bed reaction system having the same and a solid circulation method.

Description of the Related Art

A gas-solid fluidized bed is a device that changes the behavior of solid particles to be similar to that of fluids by inserting solid particles into a fluidized bed reactor, injecting gases through a plenum and a gas distributor in a lower portion of the reactor, and floating the solid particles.

Solid particles on the condition of a fixed bed or a packed bed are changed to be on the condition of bubbling fluidized bed (bubbles may not occur depending particles) by fluidization. The solid particles being in a dense phase inside the fluidized bed show behavior similar to that of liquids and are excellent in solid-gas contact efficiency compared to other contact methods.

When a flow velocity is increased more than that of the bubbling fluidized bed, a size of a bubble is sharply increased and a diameter thereof finally becomes identical to that of the bed. This is said to be Slugging. In the case of slugging, continuous increases of the flow velocity break a slug into small bubbles or in the case of the bubbling fluidized bed, a bubble frequency is increased to improve the uniformity thereof, thereby making the line of a bubble shape to be blurred gradually and consequently eliminating boundaries between bubble and emulsion phases.

This above condition is said to be a turbulent bed. In the turbulent bed, the concentration of solids is decreased while being maintained in the fluidized bed continuously. When a flow velocity is increased more in the turbulent bed, the abrasion and entrainment of solid particles are increased rapidly. When the flow velocity exceeds a transition velocity to fast fluidization, all particles in the bed are entrained and required to be recirculated by a cyclone. The condition, at this time, is said to be a fast fluidized bed.

Due to improved characteristics in solid mixing and mass and heat transfer in comparison with other reactors, a fluidized bed process is widely used in: a physical process such as drying, adsorption, cooling, freezing, coating, moving, heat control, filtering, temperature control, etc.; a chemical reactor used in a catalytic reaction such as oxychlorination, phthalic anhydride generation, polymerization, etc.; an non-catalytic reaction such as coal combustion, coal gasification, calcination, mineral roasting, waste incineration, etc.; and an energy conversion process.

Meanwhile, in the case of a process in which two reactions occur simultaneously, such as a carbon dioxide sorption and regeneration process using a dry regenerable sorbent, an oxidation-reduction process of a chemical-looping combustor, a Fisher-Tropsch process, a sorption enhanced steam methane reforming of natural gas, a chemical-looping hydrogen generation process, etc., solid conveyance and circulation are required between two fluidized bed reactors.

As descried above, conventional methods used for solid circulation between two fluidized bed reactors are illustrated in FIGS. 1A and 1B. FIG. 1A illustrates the case that a fast fluidized bed is simultaneously used for both reaction and solid conveyance, wherein one of the two reactions, which has a lower reaction rate, is performed in the bubble fluidized bed, and the fast fluidized bed is used for solid circulation with the other reaction. However, either in the case that both reaction rates of the two reactions are low or a sufficient residence time is required, or in the case that there is a limit to a ratio of gas flows, as FIG. 1B, the two reactions are performed individually in the bubbling fluidized bed which is on a low flow velocity condition, and a fast fluidized bed is additionally used for solid conveyance. As described above, when the fast fluidized bed is additionally used in order to increase the amount of solid circulation, a method for increasing the flow velocity of gases to be injected into the fast fluidized bed is generally increased.

As described above, when two bubble fluidized bed and an additional fast fluidized bed are used, an extra gas (conveyance gas) is required to make solids rise by using the fast fluidized bed, and either an inert gas (e.g., nitrogen, argon, helium, etc.) which is irrelevant to the two reactions should be injected or a stem should be used to facilitate separation of the gas discharged by the reactions. (e.g., when hydrogen is generated from the reaction, hydrogen can be separated using a steam by condensing in the discharged gas) In particular, when the two reactions occur at high temperature and high pressure, a conveyance gas with high temperature and high pressure should be injected, thereby incurring an additional cost for preheating and pressurization. Also, a flow velocity of the fast fluidized bed should be increased to increase the amount of solid circulation, thereby increasing the cost for gas.

In order to overcome these drawbacks, Korean Patent No. 10-0870756 provides a method using a solid discharge nozzle, a solid riser and a solid recirculation pipe, and Korean Paten No. 10-1214115 provides a method using a solid discharge nozzle equipped with a bent portion. Meanwhile, Korean Patent 10-1573297 provides a solid circulation method using a screw conveyer.

However, both methods using each of a solid discharge nozzle and a screw conveyer have complicated system structures and difficulties in selecting materials of the solid discharge nozzle, the solid riser, the solid recirculation pipe and the screw conveyor under high temperature and high pressure conditions. Meanwhile, the above information disclosed in this section is merely for enhancement of understanding of the general background of the invention and should not be taken as an acknowledgement or any form of suggestion that this information forms the prior art already known to a person skilled in the art.

RELATED ART DOCUMENT

Patent Document (Patent Document 1) Korea Patent Publication 10-1214115
(Patent Document 2) Korea Patent Publication 10-1573297

(Patent Document 3) Korea Patent Publication 10-0870756

SUMMARY OF THE INVENTION

Therefore, the present invention is provided to overcome problems of conventional methods as described above. According to one exemplary embodiment of the present invention, a fluidized bed system is provided to circulate solids using pressure and density difference.

In addition, according to another embodiment of the present invention, since the minimum pressure difference ($\Delta P_2$) between first and second fluidized bed reactors is proportional to the density of particles, in order to make solid circulation between the first and second fluidized bed reactor, a reaction for increasing the density of solid particles occurs in a first fluidized bed reactor, and a reaction for decreasing the density of the solid particles occurs in a second fluidized bed reactor, thereby being capable of circulating solids and increasing the amount thereof even at the lower pressure difference.

To achieve in the present invention are not limited to the technical problem mentioned above, in another aspect not covered will be clearly understood to those of ordinary skilled in the art from the following description.

A primary object of the present invention is to provide a system for circulating solids between fluidized bed reactors using pressure and density in a fluidized bed reaction system having a plurality of fluidized bed reactors each of which is injected with a fluidizing gas, and a plurality of cyclones which separate gases and entrained solids discharged from each of the plurality of fluidized bed reactors, wherein the fluidized bed circulation system using pressure difference may include: a plurality of pressure control valves which are formed in each gas vent of a plurality of cyclones and control the internal pressure of each the plurality of fluidized bed reactor; a lower loop seal which interconnects lower portions of the two fluidized bed reactors and is injected with a fluidizing gas; an upper loop seal which interconnects sides of the two fluidized bed reactors and is injected with a fluidizing gas; and a control part which controls each the pressure control valves and makes a pressure difference, that is, a difference between the internal pressure of the two fluidized bed reactors to be over a predetermined pressure difference, thereby circulating solids between the two fluidized bed reactors.

And the lower loop seal may include: a plenum which is equipped with a partition and is injected with a fluidizing gas from opposite sides; a distributor which is positioned at an upper portion of the plenum and has a plurality of pores, thereby permitting the fluidizing gas to move up to the upper portion; and a connection pipe which is positioned at an upper end of the distributor and each end portion of which is connected between the two fluidized bed reactors, thereby conveying the fluidizing gas to each the two fluidized bed reactors.

Also, the upper loop seal may include: a solid inlet pipe which flows in solids from one of the two fluidized bed reactor; a solid outlet pipe which flows out solids to the other; and a U shaped pipe which is positioned between the solid inlet pipe and the solid outlet pipe, and there may be a height difference between a solid inlet height of the solid inlet pipe and a solid outlet height of the solid outlet pipe.

A secondary object of the present invention is to provide a fluidized reaction system having a solid circulation system using pressure and density difference, wherein the fluidized reaction system may include: a first fluidized bed reactor which has a first fluidizing gas injection part to be injected with a fluidizing gas; a second fluidized bed reactor which has a second fluidizing gas injected part to be injected with a fluidizing gas; a first cyclone to which solids and gases are conveyed from the first fluidized bed reactor and which separates the conveyed solids and gases; a second cyclone to which solids and gases are conveyed from the second fluidized bed reactor and which separates the conveyed solids and gases; a first pressure control valve which is formed on a gas vent of the first cyclone and controls the internal pressure of the first fluidized bed reactor; a second pressure control valve which is formed on a gas vent of the second cyclone and controls the internal pressure of the second fluidized bed reactor; a lower loop seal which interconnects lower portions of the first fluidized bed reactor and the second fluidized bed reactor and is injected with a fluidizing gas; an upper loop seal which interconnects sides of the first fluidized bed reactor and the second fluidized bed reactor and is injected with a fluidizing gas; and a control part which controls each of the first pressure control valve and the second pressure control valve to make an internal pressure difference, that is, a difference between the internal pressure of the first fluidized bed reactor and the second fluidized bed reactor to be over a predetermined pressure difference, thereby circulating the solids between the first fluidized bed reactor and the second fluidized bed reactor.

Further, the predetermined pressure difference may be $\Delta P_2$ represented by Formula 1 as below.

$$\Delta P_2 = \Delta P_1 = H_4(1 - \varepsilon_{mf})(\rho_s - \rho_g)\frac{g}{g_c} \qquad \text{[Formula 1]}$$

In the formula 1, $H_4$ is a difference between a solid bed height ($H_2$) of the second fluidized bed reactor and a solid bed height ($H_1$) of the first fluidized bed reactor, $\Delta P_1$ is a pressure drop (pressure difference) [Pa] by the solid bed, corresponding to a height ($H_2$) of the second fluidized bed reactor, $\varepsilon_{mf}$ is a voidage [−] of the solid bed in the minimum fluidized bed condition, $\rho_s$ is a solid density [kg/m$^3$], $\rho_g$ is a gas density [kg/m$^3$], $g_c$ is a constant of gravitational acceleration, 1[(kgm)/(Ns$^2$)] and g is gravitational acceleration, 9.8 [m/s$^2$].

And the lower loop seal may include: a plenum which is equipped with a partition and is injected with a fluidizing gas from opposite sides; a distributor which is positioned at an upper portion of the plenum and has a plurality of pores, thereby permitting the fluidizing gas to move up to the upper portion; and a connection pipe which is positioned at an upper end of the distributor and each end portion of which is connected between the first fluidized bed reactor and the second fluidized bed reactor, thereby conveying the fluidizing gas to each of the first fluidized bed reactor and the second fluidized bed reactor.

Also, the upper loop seal may include: a solid inlet pipe which flows in solids from the second fluidized bed reactor; a solid outlet pipe which flows out solids to the first fluidized bed reactor; and a U shaped pipe which is positioned between the solid inlet pipe and the solid outlet pipe.

And $H_4$ is a difference between a height of a connection portion where a solid inlet pipe is connected to the second fluidized bed reactor and a height of a connection portion where the solid inlet pipe is connected to the first fluidized bed reactor, the solid may be circulated from the first fluidized bed reactor to the second fluidized bed reactor through the lower loop seal, and recirculated from the second fluidized bed reactor to the first fluidized bed reactor through the upper loop seal.

Also, a particle density of the solid inside the first fluidized bed reactor may be greater than that of the solid inside the second fluidized bed reactor.

A thirdly object of the present invention is to provide a fluidized bed solid circulation method using pressure and density difference between a fluidized bed reaction system including: first and second fluidized bed reactors into which a fluidizing gas is flown respectively; first and second cyclones which separate gases and entrained solids discharged from each the first and second fluidized bed reactors; first and second pressure control valves which are formed on gas vents of each the first and second cyclones and control an internal pressure of each the first and second fluidized bed reactors; a lower loop seal which interconnects lower portions of the first and second fluidized bed reactors and is injected with a fluidizing gas; and an upper loop seal which interconnects sides of the first fluidized bed reactor and the second fluidized bed reactor and is injected with a fluidizing gas, wherein the solid circulation method may circulate solids inside the first and second fluidized bed reactors by using pressure and density difference and comprise: inserting solid particles into the first and second fluidized bed reactors and the lower and upper loop seals on the same internal pressure condition in the first fluidized bed reactor and the second fluidized bed reactor; injecting a fluidizing gas into the first and second fluidized bed reactors and the lower and upper loop seals; controlling an internal pressure of the first fluidized bed reactor to be greater than that of the second fluidized reactor by that a control part controls the first pressure control valve and the second pressure control valve; rendering a pressure difference of the first fluidized bed reactor and the second fluidized bed reactor to reach a predetermined pressure difference; and circulating the solids between the first fluidized bed reactor and the second fluidized bed reactor.

Further, in the step of reaching a predetermined pressure difference, a height of a solid bed in the second fluidized bed reactor may reach a height of a solid inlet pipe ($H_{UL}$), and a difference ($H_4$) in a solid bed height of the first fluidized bed reactor and a solid bed height of the second fluidized bed reactor may reach a difference between a height of a connection portion where a solid inlet pipe of an upper loop seal is connected to the second fluidized bed reactor, and a height of a connection portion where a solid outlet pipe of the upper loop seal is connected to the first fluidized bed reactor.

Additionally, the predetermined pressure difference may be $\Delta P_2$ represented by Formula 1 as below.

$$\Delta P_2 = \Delta P_1 = H_4(1 - \varepsilon_{mf})(\rho_s - \rho_g)\frac{g}{g_c}$$ [Formula 1]

In Formula 1, $H_4$ is a difference between a solid bed height of the first fluidized bed reactor and a solid bed height of the second fluidized bed reactor, $\Delta P_1$ is a pressure drop (pressure difference) [Pa] by the solid bed, corresponding to a height ($H_2$) of the second fluidized bed reactor, $\varepsilon_{mf}$ is a voidage [–] of the solid bed in the minimum fluidized bed condition. $\rho_s$ is a solid density [kg/m$^3$], $\rho_g$ is a gas density [kg/m$^3$], $g_c$ is a constant of gravitational acceleration, 1[(kgm)/(Ns$^2$)] and g is gravitational acceleration, 9.8 [m/s$^2$].

In the step of circulating the solids, the solids may be circulated from the first fluidized bed reactor to the second fluidized bed reactor through the lower loop seal, and recirculated from the second fluidized bed reactor to the first fluidized bed reactor through the upper loop seal.

Also, a reaction for increasing the density of the solid particles may occur in the first fluidized bed reactor, while a reaction for decreasing the density of the solid particles may occur in the second fluidized bed reactor.

According to the exemplary embodiment of the present invention, a fluidized bed circulation system using pressure and density differences, a fluidized bed reaction system having the same and a solid circulation method are capable of circulating solids without neither a solid spray nozzle nor a screw conveyer.

Also, according to another embodiment of the present invention, since the minimum pressure difference ($\Delta P_2$) between first and second fluidized bed reactors is proportional to the density of particles, in order to make solid circulation between the first and second fluidized bed reactor, a reaction for increasing the density of solid particles occurs in a first fluidized bed reactor, and a reaction for decreasing the density of the solid particles occurs in a second fluidized bed reactor, thereby being capable of circulating solids and increasing the amount thereof even at the lower pressure difference.

Meanwhile, effects of the present invention are not limited to the effects mentioned above, in another aspect not covered will be clearly understood to those of ordinary skilled in the art from the following description.

BRIEF DESCRIPTION OF THE DRAWINGS

The following drawings depict only preferable embodiments of the present invention and render the technical idea of the present invention to be understood more clearly with reference to the following detailed description. Therefore, the present invention is not limited to these drawings, in which.

DETAILED DESCRIPTION OF THE EMBODIMENTS

Figure 1A:
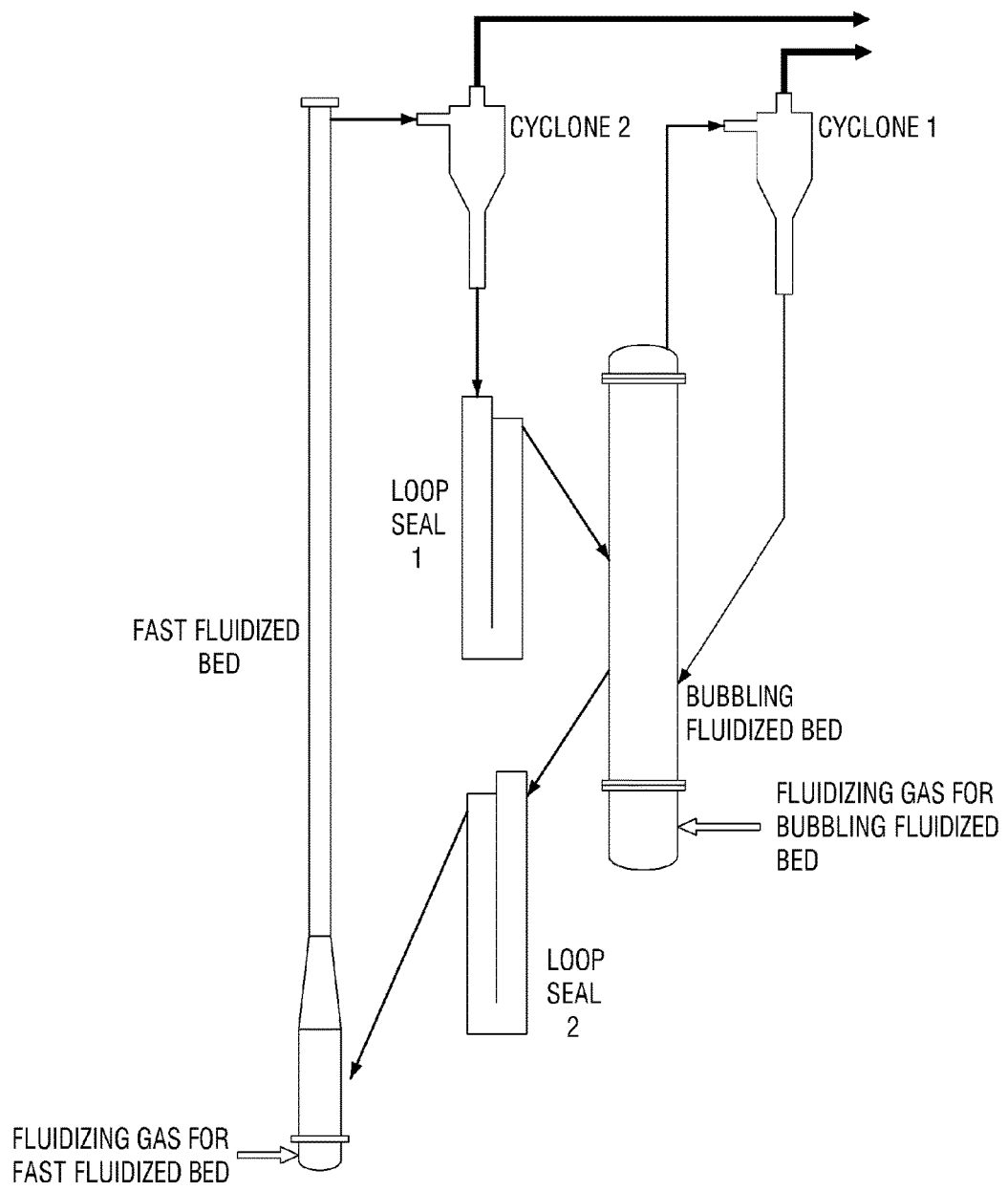
FIG. 1A is a schematic view of a multi fluidized beds reaction system to illustrate conventional solid circulation between a fast fluidized bed and a bubble fluidized bed.
Figure 1B:
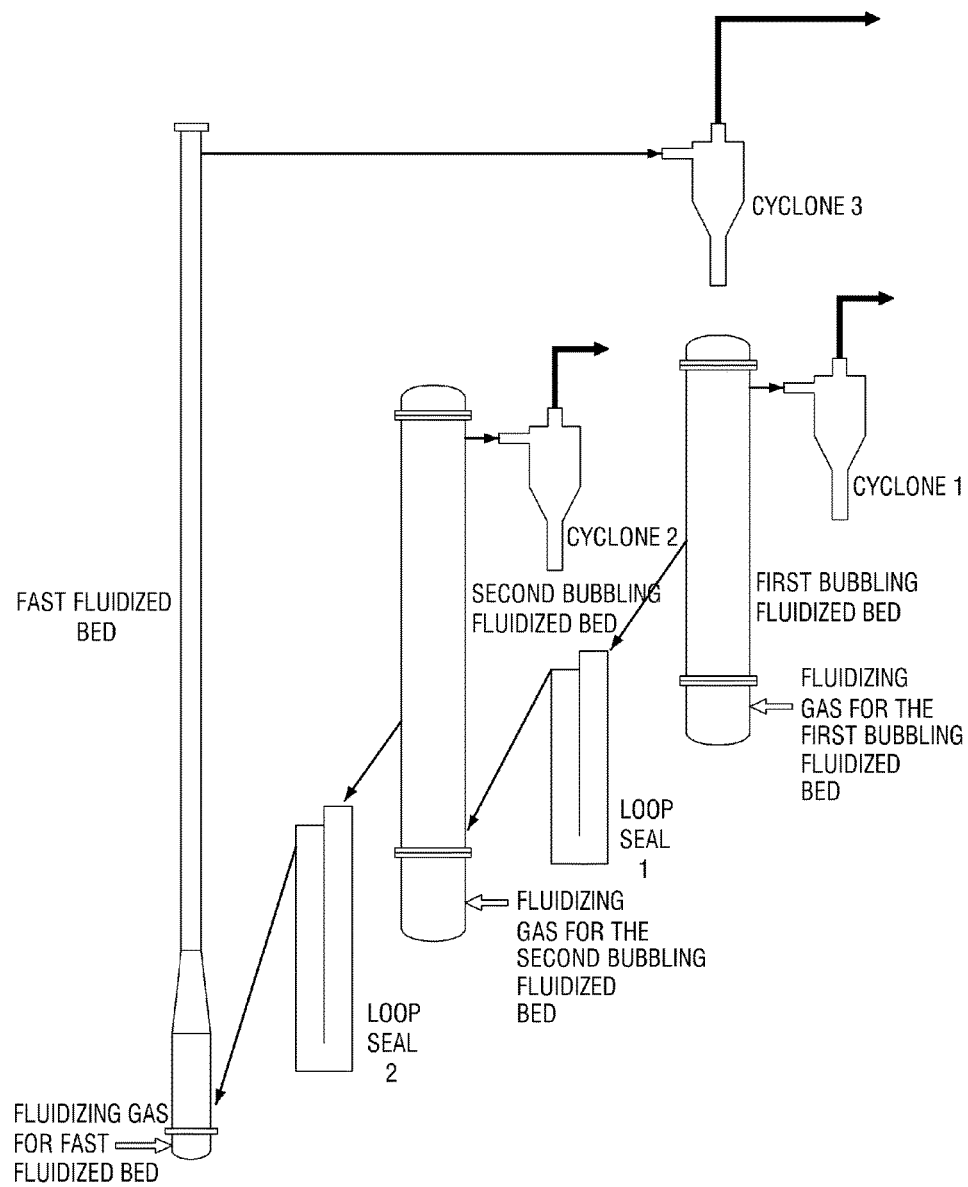
FIG. 1B is a schematic view of a multi fluidized beds reaction system to illustrate conventional solid circulation between a fast fluidized bed, a bubbling fluidized bed and a bubbling fluidized bed.

Exemplary embodiments will now be described with reference to the accompanying drawings to understand objects, other objects, features and advantages of the present invention. However, the present invention is not limited to the exemplary embodiments described herein and may be embodied in different forms. Rather, the exemplary embodiments are provided so that this disclosure will be through and complete, and will fully convey the idea of the present invention to those of ordinary skilled in the art.

In the description, when an element is referred to as being on the other element, it means that the element can be directly formed on the other element or interpose another element between them. Also, in the drawings, thickness of elements is exaggerated for easy understanding of technical features.

In the description, exemplary embodiments will be described with reference to a top plan view and/or an end view as an ideal exemplary view of the present invention. In the drawings, thickness of membranes and areas is exaggerated for easy understanding of technical features. Thus, a form of exemplary views may be changed according to manufacture technologies and/or permissible errors. Therefore, exemplary embodiments of the present invention are not limited to the particular form illustrated but include changes in forms generated by manufacture processes. For instance, an area illustrated as a right angle may have a form of being rounded or having a predetermined curvature. Thus, areas as illustrated in the drawing have properties and the shape thereof is intended to illustrate a particular form but do not limit the scope of the invention. In many different exemplary embodiments, the terms such as 'first', 'second' and etc., are used for the description of many different elements, these elements, however, should be not limited by such terms. These terms are merely used for the purpose of distinguishing one element from the others only. The exemplary embodiments described and embodied herein include their complementary embodiments.

The terms used in the description are for the purpose of describing exemplary embodiments only and are not intended to limit the present invention. As used in the description, the singular forms are intended to include the plural forms as well, unless the context clearly indicates otherwise. The terms "comprise" and/or "comprising" used in the description do not the presence or addition of one or more other components.

In describing exemplary embodiments hereinafter, many specific matters are provided to assist in more detailed explanation and comprehensive understanding of the present invention. However, it is apparent that the exemplary embodiments can be used by those of ordinary skilled in the art without those specific matters. In the description of the present invention, certain explanations which are commonly known but hardly related thereto are omitted in order to prevent unnecessary obscurity in explanation of the present invention.

Figure 2:
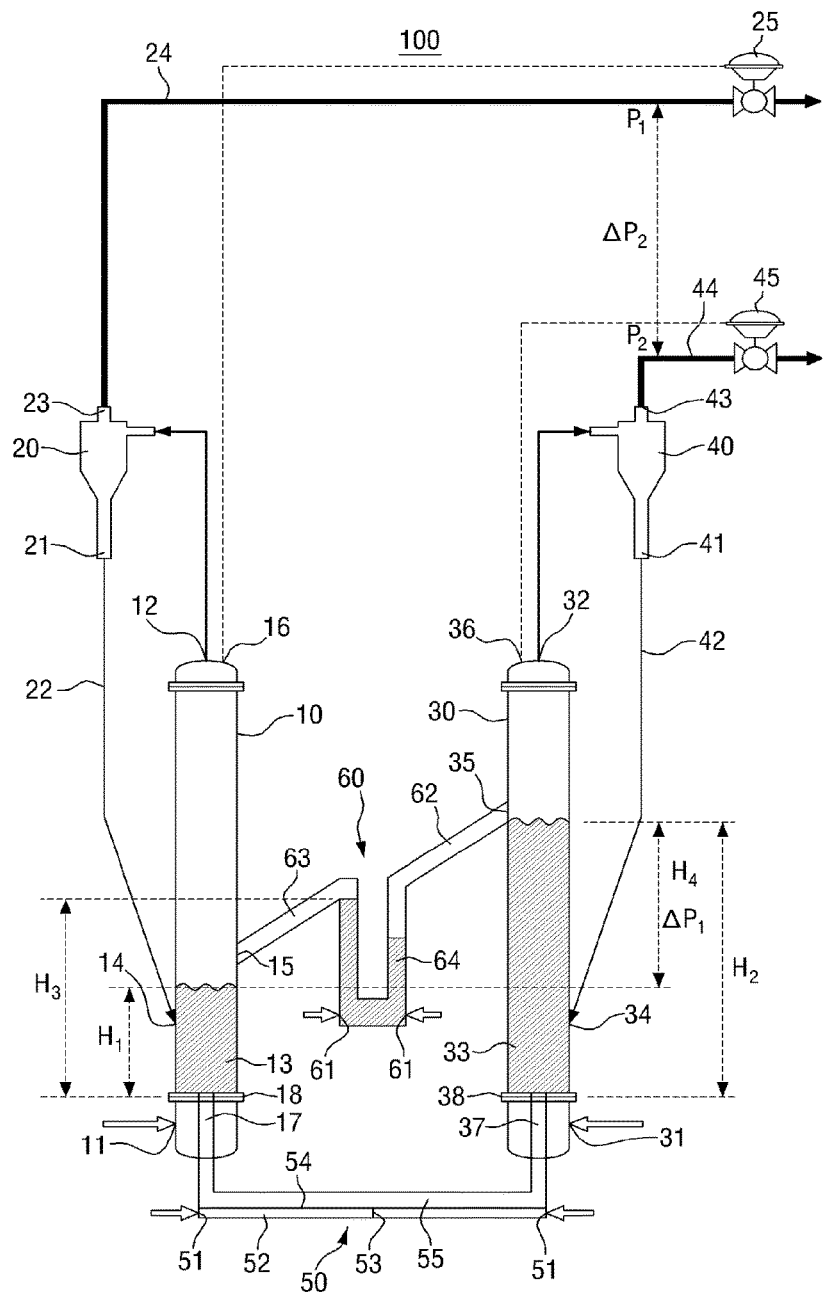
FIG. 2 is a schematic view of a fluidized bed reaction system having a fluidized bed solid circulation system using pressure and density difference according to the exemplary embodiment of the present invention.
Figure 3:
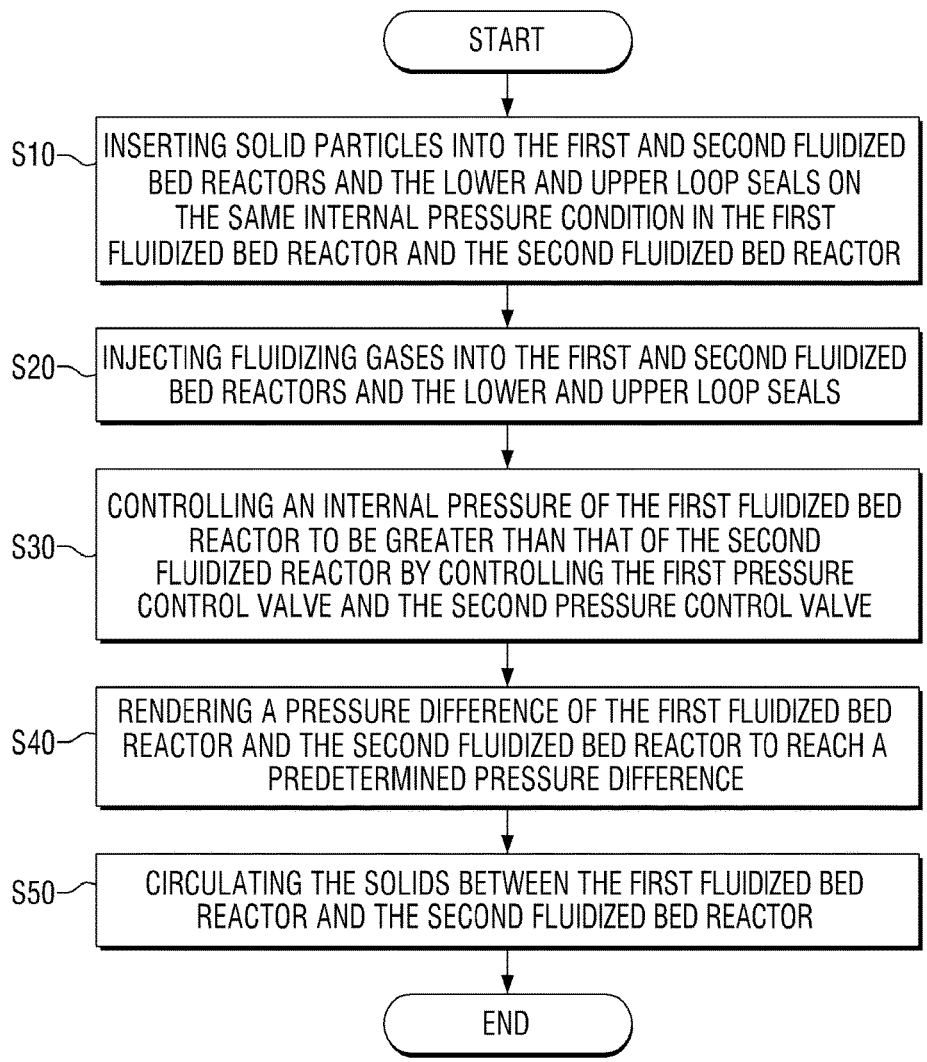
FIG. 3 is a flowchart of a fluidized bed solid circulation method using pressure and density difference according to the exemplary embodiment of the present invention.
Figure 4:
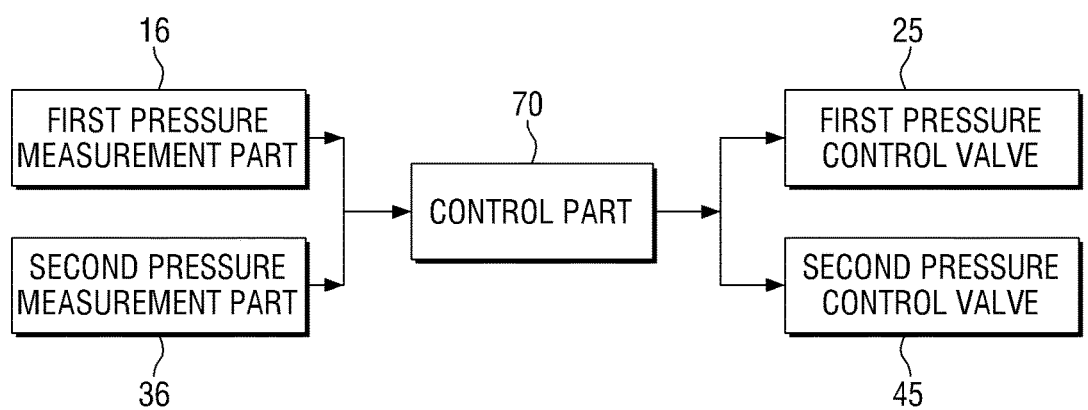
FIG. 4 is a block diagram showing a signal flow in a control part according to the exemplary embodiment of the present invention.

Hereinafter, according to the exemplary embodiment of the present invention, explained are configurations and the functions of a fluidized bed reaction system 100 having a fluidized bed solid circulation system using pressure and density difference, and a solid circulation method. Firstly, FIG. 2 is a schematic view to illustrate a fluidized bed reaction system 100 having a fluidized bed solid circulation system using pressure and density difference according to the exemplary embodiment of the present invention. And FIG. 3 is a flowchart to illustrate a fluidized bed solid circulation method using pressure and density difference according to the exemplary embodiment of the present invention. Also, FIG. 4 is a block diagram showing a signal flow in a control part according to the exemplary embodiment of the present invention.

As illustrated in FIG. 2, the fluidized bed reaction system 100 having a fluidized bed solid circulation system using pressure and density difference according to the exemplary embodiment may be configured to include a first fluidized bed reactor 10, a second fluidized bed reactor 30, a first cyclone 20, a second cyclone 40, a first pressure control valve 25, a second pressure control valve 45, a lower loop seal 50, an upper loop seal 60 and etc.

As illustrated in FIG. 2, the first fluidized bed reactor 10 and the second fluidized bed reactor 30 are bubbling fluidized beds capable of being performed on the condition of a low flow velocity, respectively. Gases and some of entrained solids discharged from the first fluidized bed reactor 10 are separated in the first cyclone 20, thereby recirculating the solids to the first fluidized bed reactor 10 and discharging the gases through a first vent 24. Similarly, gases and some of entrained solids discharged from the second fluidized bed reactor 30 are separated in the second cyclone 40, thereby recirculating the solids to the second fluidized bed reactor 30 and discharging the gases through a second vent 44.

A first pressure control valve 25 is formed on one side of the first gas vent 24 and a second pressure control valve 45 is formed on the second vent 44, thereby controlling the pressure of each the first fluidized bed reactor 10 and the second fluidized bed reactor 30.

The first fluidized bed reactor 10 and the second fluidized bed reactor 30 are interconnected to each other with the upper loop seal 60 and the lower loop seal 50, and a fluidizing gas is injected into the upper loop seal 60 and the lower loop seal 50 to fluidize solid particles being in the upper loop seal 60 and the lower loop seal 50, thereby rendering the behavior thereof similar to that of a fluidized phase. A gas required for the reaction may be used as a fluidizing gas to be injected into the upper loop seal 60 and the lower loop seal 50, a steam may be used for fluidization and separated by condensation after discharge, or an inert gas may be used therefor.

Hereinafter, each configuration of the present invention will be described. As illustrated in FIG. 2, the first fluidized bed reactor 10 may be inserted with solids, have a built-in distributor 18 and include a first fluidizing gas injection part 11 into which a first fluidizing gas is injected, a first discharge part 12 through which gases and entrained solids are discharged, a first solid inlet 14 which flows in the solids discharged through a solid discharge part of the first cyclone, a solid inlet pipe 15 which is connected with the upper loop seal 60, a first pressure measurement part 16 which measures an internal pressure of the first fluidized bed reactor 10, and a solid discharge pipe 17 through which solids in a first solid bed 13 are discharged to the lower loop seal 50.

Further, the first cyclone 20 flows in gases and entrained solids discharged from the first discharge part 12 of the first fluidized bed reactor 10, separates the flown solids and gases and circulates the solids to the first fluidized bed reactor 10 through a first circulation pipe 22 which is interposed between a first solid discharge part 21 and the first solid inlet 14, wherein a first gas discharge part 23 is connected with the first vent 24.

Further, as illustrated in FIG. 2, the second fluidized bed reactor 30 may be inserted with solids, have a built-in distributor 38 and include a second fluidizing gas injection part 31 into which a second fluidizing gas is injected, a second discharge part 32 from which gases and entrained solids are discharged, a second solid inlet 34 which flows in the solids discharged through a solid discharge part of the second cyclone 40, a solid outlet pipe 35 which is connected with the upper loop seal 60, a second pressure measurement part 36 which measures an internal pressure of the second fluidized bed reactor 30, and a solid supply pipe 37 which flows in the solids from the lower loop seal 50.

Further, the second cyclone 40 flows in gases and entrained solids discharged from the second discharge part 32 of the second fluidized bed reactor 30, separates the flown solids and gases and circulates the solids to the second fluidized bed reactor 30 through a second circulation pipe 42 which is interposed between a second solid discharge part 41 and the first solid inlet 34, wherein a first gas discharge part 43 is connected with the second vent 44.

The first pressure control valve 25 equipped with the first gas vent 24 controls an internal pressure of the first fluidized bed reactor 10, while the second pressure control valve 45 equipped with the second gas vent 44 controls an internal pressure of the second fluidized bed reactor 30.

And the lower loop seal 50 interconnects lower portions of the first fluidized bed reactor 10 and the second fluidized bed reactor 30 and is injected with a fluidizing gas through a third fluidizing gas injection part 51. The lower loop seal 50 is configured to include a plenum 52 which is equipped with a partition 53 and is injected with a fluidizing gas from opposite sides; a distributor 54 which is positioned at an upper portion of the plenum 52 and has a plurality of pores, thereby permitting the fluidizing gas to move up to the upper portion; and a connection pipe 55 which is positioned at an upper end of the distributor and each end portion of which is connected between the two fluidized bed reactors, thereby conveying the fluidizing gas to each of the first fluidized bed reactor 10 and the second fluidized bed reactor 30.

The upper loop seal 60 interconnects sides of the first fluidized bed reactor 10 and the second fluidized bed reactor 30 and is injected with a fluidizing gas through a fourth fluidizing gas injection part 61. In particular, the upper loop seal 60 is configured to include a solid inlet pipe 62 which flows in solids from the second fluidized bed reactor 30, a solid outlet pipe 63 which flows out the solids to the first fluidized bed reactor 10, and a U shaped pipe which is positioned between the solid inlet pipe and the solid outlet pipe.

The solid inlet pipe 62 is connected with the solid outlet 35 of the second fluidized bed reactor 30, and the solid outlet pipe 63 is connected with the solid inlet column 15 of the first fluidized reactor 10. Further, the solid outlet column 35 and the solid inlet column 15 are connected to have a height difference.

As illustrated in FIG. 4, the control part controls the first pressure control valve 25 and the second pressure control valve 45 based on values measured in the first pressure measurement part 16 and the second pressure measurement part 36 to make an internal pressure difference in the first fluidized bed reactor 10 and the second fluidized bed reactor 30 to be over a predetermined pressure difference, thereby circulating solids between the first fluidized bed reactor 10 and the second fluidized bed reactor 30.

Figure 5:
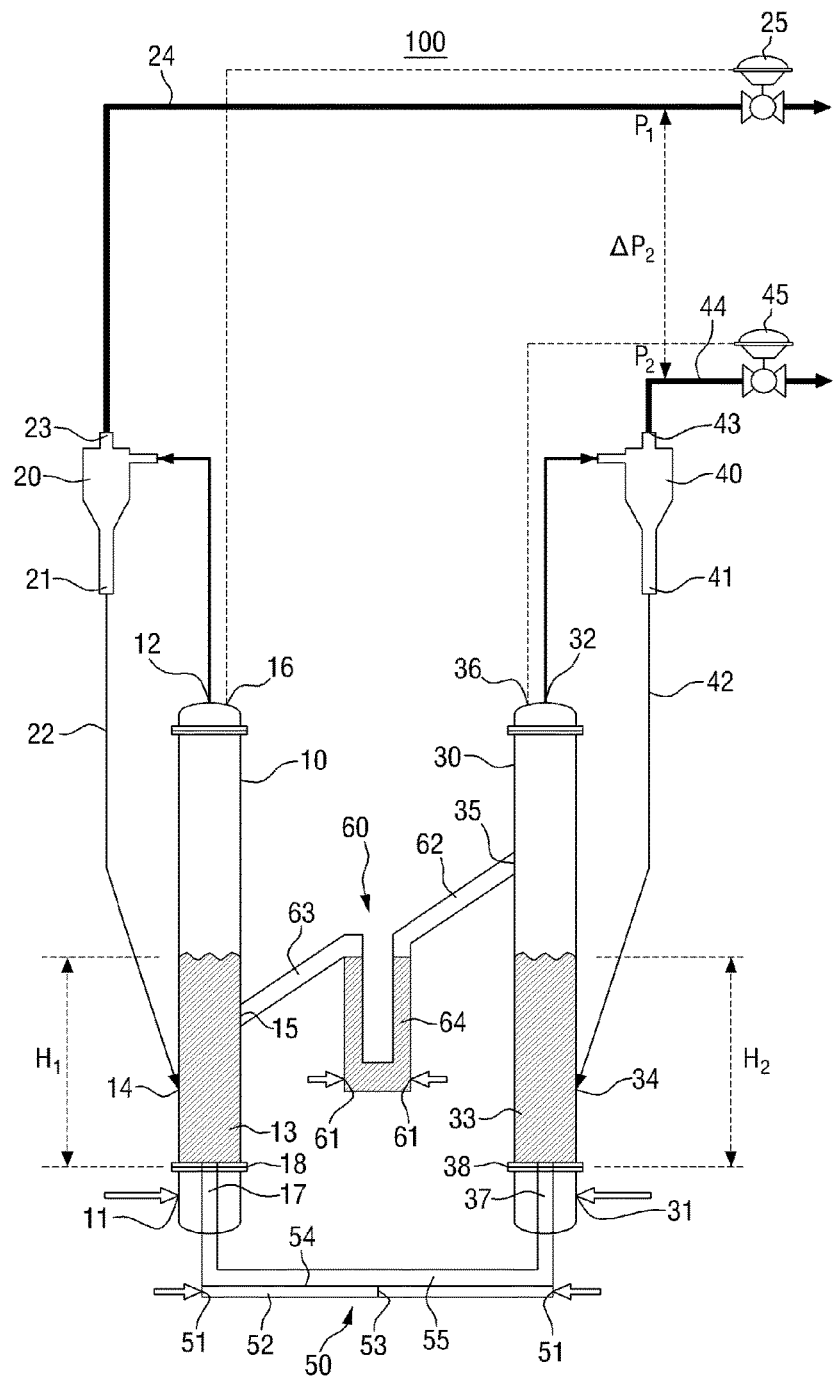
FIG. 5 is a schematic view of a fluidized bed reaction system having a fluidized solid circulation system using pressure and density difference according to the exemplary embodiment of the present invention when $P_1=P_2$.

Hereinafter, a solid circulation method will be described according to the configurations mentioned above. Firstly, solid particles are inserted into the first fluidized bed reactor 10 and the second fluidized bed reactor 30 and the lower loop seal 60 and the upper loop seal 50 on the same internal pressure condition in the first fluidized bed reactor and the second fluidized bed reactor (S10). And a fluidizing gas is injected into the first fluidized bed reactor 10 and the second fluidized bed reactor 30 and the lower loop seal 50 and the upper loop seal 60 (S20). FIG. 5 is a schematic view of a fluidized bed reaction system 100 having a fluidized solid circulation system using pressure and density difference according to the exemplary embodiment of the present invention when $P_1=P_2$.

In other words, on the same pressure condition in the first fluidized reactor 10 and the second fluidized reactor 30 (a pressure difference between the two fluidized beds is 0, that is, $\Delta P_2 = 0$), solid particles are inserted into the first fluidized reactor 10 and the second fluidized reactor 30 and the solids inside the first and second fluidized bed reactor 10 and 30 are fluidized to convey the solids through the lower loop seal 50, thereby rendering a height ($H_1$) of the first solid bed 13 inside the first fluidized bed reactor 10 to be equal to a height ($H_2$) of the second solid bed 33 inside the second fluidized bed reactor 30. On this condition, the solids cannot be circulated and solid particles reside in the first fluidized bed reactor 10, the second fluidized reactor 30, the upper loop seal 60 and the lower loop seal 50.

Figure 6:
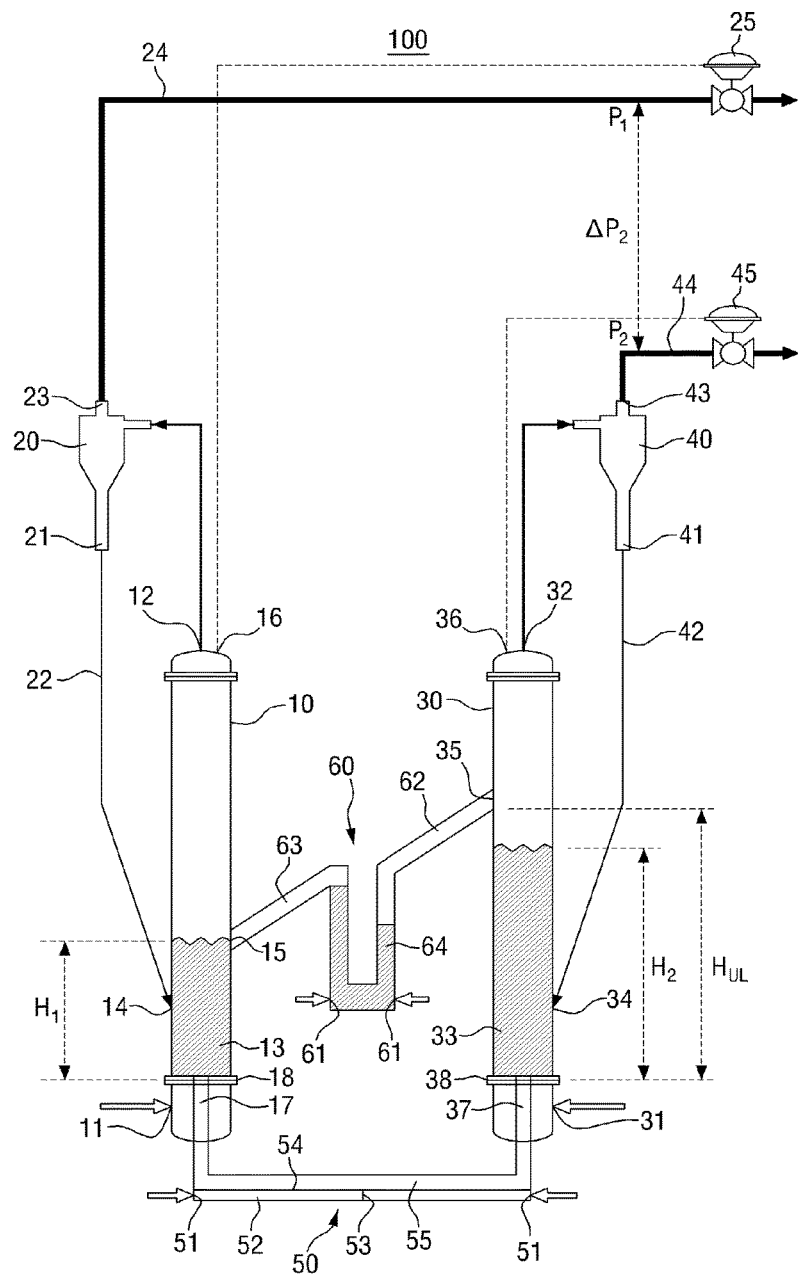
FIG. 6 is a schematic view of a fluidized bed reaction system having a fluidized solid circulation system using pressure and density difference according to the exemplary embodiment of the present invention when $P_1>P_2$ and $\Delta P_2<\Delta P_1$.

And the control part controls the first pressure control valve 25 and the second pressure control valve 45, thereby controlling an internal pressure of the first fluidized bed reactor 10 to be greater than that of the second fluidized reactor 30 (S30). FIG. 6 is a schematic view of the fluidized bed reaction system 100 having a fluidized solid circulation system using pressure and density difference according to the exemplary embodiment of the present invention when $P_1 > P_2$ and $\Delta P_2 < \Delta P_1$.

In other words, when a pressure ($P_1$) of the first fluidized bed reactor 10 becomes higher than a pressure ($P_2$) of the second fluidized bed reactor (30) by controlling the first pressure control valve 25 which controls an internal pressure of the first fluidized bed reactor 10 and the second pressure control valve 45 which controls an internal pressure of the second fluidized bed reactor 30, as illustrated in FIG. 6, a height ($H_1$) of the solid bed 13 in the first fluidized bed reactor 10 becomes lower and a height ($H_2$) of the solid bed 33 in the second fluidized bed reactor 30 becomes higher, while conveying solids through the lower loop seal 50. In this case, since the height (H2) of the second solid bed 33 in the second fluidized bed reactor 30 is lower than a height ($H_{UL}$) of the upper end of the solid inlet pipe 62 of the upper loop seal 60, the solids would not be circulated.

Figure 7:
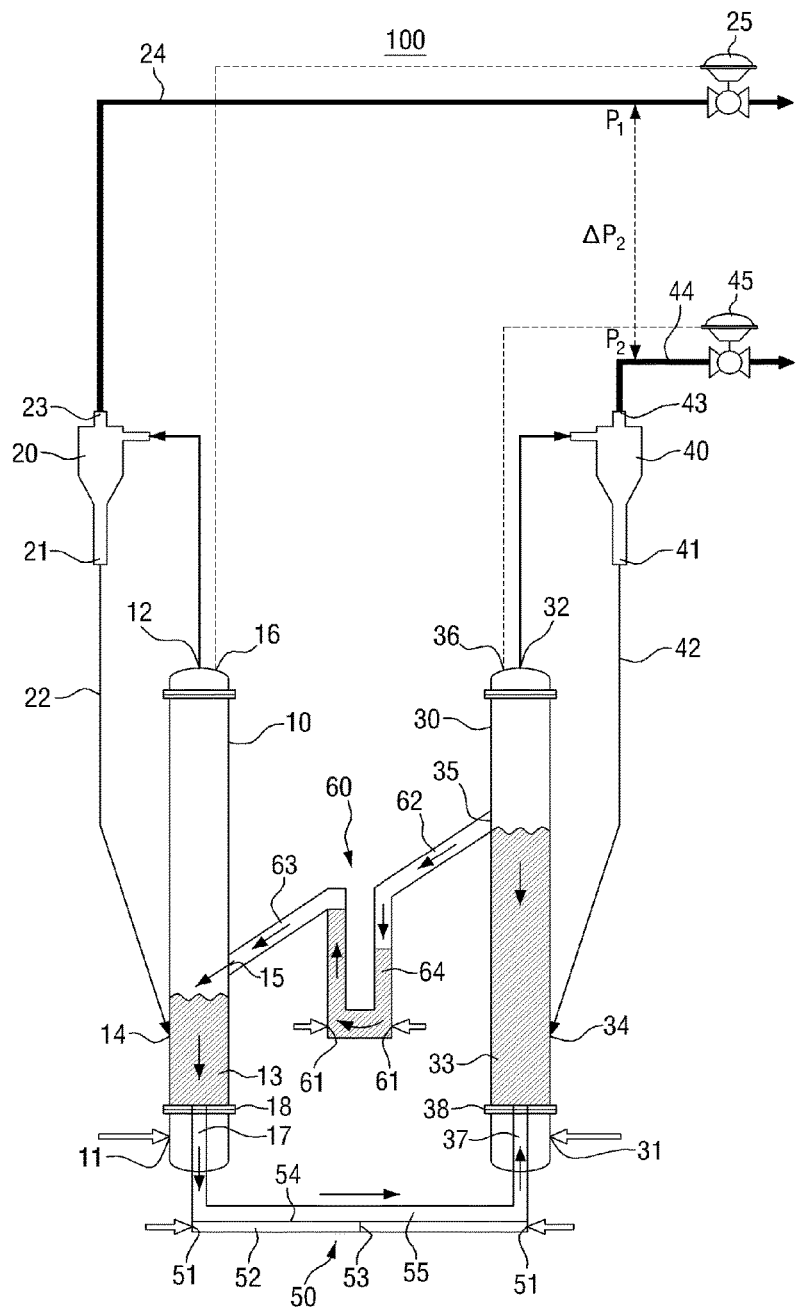
FIG. 7 is a schematic view of a fluidized bed reaction system having a fluidized bed solid circulation system using pressure and density difference according to the exemplary embodiment to illustrate a solid flow direction when $\Delta P_2 \geq \Delta P_1$.

In addition, a pressure between the first fluidized bed reactor 10 and the second fluidized bed reactor 30 reaches a predetermined pressure (S40). FIG. 7 is a schematic view of a fluidized bed reaction system 100 having a fluidized bed solid circulation system using pressure and density difference according to the exemplary embodiment to illustrate a solid flow direction when $\Delta P_2 \geq \Delta P_1$.

That is, when a pressure difference between the first fluidized bed reactor 10 and the second fluidized bed reactor 30 ($\Delta P_2 = \Delta P_1 - \Delta P_2$) becomes increased more, as illustrated in FIG. 2, a height ($H_1$) of the first solid bed 13 is decreased more while a height ($H_2$) of the second solid bed 33 is increased more. Thus, when the height ($H_2$) of the second solid bed 33 inside the second fluidized bed reactor 30 reaches a height ($H_{UL}$) of a solid inlet in the upper loop seal 60, solid particles of the second fluidized bed reactor 30 are conveyed to the first fluidized bed reactor 10 through the upper loop seal 60. At this time, a height of the second solid bed 33 of the second fluidized bed reactor 30 is increased by $H_4$ from a height of the first solid bed 13 of the first fluidized bed reactor 10, and a pressure ($\Delta P_1$) added downwardly by solids corresponding to $H_4$ becomes equal to a pressure difference ($\Delta P_2$) between the two fluidized beds. Accordingly, the minimum pressure difference ($\Delta P_2$) between the two reactors required for the solid circulation can be determined based on the formula 1 as bellow.

$$\Delta P_2 = \Delta P_1 = H_4(1 - \varepsilon_{mf})(\rho_s - \rho_g)\frac{g}{g_c} \quad \text{[Formula 1]}$$

wherein, $H_4$ is a height difference between the first solid bed and the second solid bed $\Delta P_1$ is a pressure drop (pressure difference) [Pa] by the solid bed corresponding to a height of $H_4$ $\Delta P_2$ is the minimum pressure difference [Pa] required for solid circulation $\varepsilon_{mf}$ is a voidage [–] of the solid bed in the minimum fluidized bed condition $\rho_s$ is a solid density [kg/m$^3$]

$\rho_g$ is a gas density [kg/m$^3$]

$g_c$ is a constant of gravitational acceleration, 1[(kgm)/(Ns$^2$)]

g is gravitational acceleration, 9.8 [m/s$^2$]

As a result, the first pressure control valve 25 and the second pressure control valve 45 controls the first fluidized bed reactor 10 and the second fluidized bed reactor 30 respectively to generate a pressure difference ($\Delta P_2$) between the two fluidized beds. Such a pressure difference changes heights of solid beds being inside the first fluidized bed reactor 10 and the second fluidized bed reactor 30 to circulate the solids from the first fluidized bed reactor 10 to the second fluidized bed reactor 30 through the lower loop seal 50 and to complete a system for recirculating the solid from the second fluidized bed reactor 30 to the first fluidized bed reactor 10 through the upper loop seal 60 (S50).

Meanwhile, as shown in the formula 1, since the minimum pressure difference ($\Delta P_2$) between the first and second fluidized bed reactors 10, 30 required for the solid circulation is proportional to the density of particles, in order to make solid circulation between the first and second fluidized bed reactors 10, 30 smooth (that is, being capable of solid circulation at the lower pressure difference and increasing the amount thereof), it is advantageous that a particle density of solids inside the second fluidized bed reactor 30 is lower than a particle density of solids inside the first fluidized bed reactor 10.

In other word, it is advantageous to proceed a reaction for increasing the density of solid particles in the first fluidized bed reactor 10 and a reaction for decreasing the density of solid particles in the second fluidized bed reactor 30.

For instance, in the case of chemical-looping combustion reaction as below, in a view of solid particles, oxidation reaction is a reaction in which oxygen in the air is bound to Ni. In contrast, reduction reaction is a reaction in which NiO is changed into Ni by separating oxygen included in the solid particle. Accordingly, as reactions are proceeded, the density of solid particles is increased in an oxidation reactor while being decreased in a reduction reactor.

Oxidation reaction of chemical-looping combustion: $4Ni+2O_2 \rightarrow 4NiO$

Reduction reaction of chemical-looping combustion: $4NiO+CH_4 \rightarrow 4Ni+CO_2+2H_2O$ Therefore, in the case of chemical-looping combustion, the first fluidized bed reactor 10 in FIG. 2 is used as an oxidation reactor in which the density of particles is increased and the second fluidized bed reactor 30 is used as a reduction reactor in which the density of particles is decreased, thereby being capable of solid circulation at the lower pressure difference and increasing the amount thereof at the same pressure difference.

In addition, the system and method described above are not limited to the configurations and methods of the exemplary embodiments of the present invention but various alterations may be made thereto by selectively combing each the embodiments.

DESCRIPTION OF SYMBOL

10: a first fluidized bed reactor
11: a first fluidizing gas injection part
12: a first discharge part
13: a first solid bed
14: a first solid inlet
15: a solid inlet pipe
16: a first pressure measurement part
17: a solid discharge pipe
18: a first fluidized bed distributor
20: a first cyclone
21: a first solid discharge part
22: a first circulation pipe
23: a first gas discharge pipe
24: a first gas vent
25: a first pressure control valve
30: a second fluidized bed reactor
31: a second fluidizing gas injection part
32: a second discharge part
33: a second solid bed
34: a second solid inlet
35: a solid outlet pipe
36: a second pressure measurement part
37: a solid supply pipe
38: a second fluidized bed distributor
40: a second cyclone
41: a second solid discharge part
42: a second circulation pipe
43: a second gas discharge part
44: a second gas vent
45: a second pressure control valve
50: a lower loop seal
51: a third fluidizing gas injection part
52: a plenum
53: a partition
54: a distributor
55: a connection pipe
60: an upper loop seal
61: a forth fluidizing gas injection part
62: a solid inlet pipe
63: a solid outlet pipe
64: a U-shaped pipe
70: a control part
100: a fluidized bed reaction system having a solid circulation system using pressure and density differences

What is claimed is:

1. A system for circulating solids being inside the fluidized bed reactors therebetween using pressure and density difference in a fluidized bed reaction system having a plurality of fluidized bed reactors each of which is injected with a fluidizing gas, and a plurality of cyclones which separate gases and entrained solids discharged from each of the plurality of fluidized bed reactors, wherein the fluidized bed circulation system using pressure difference comprises:
 a plurality of pressure control valves which are formed in each gas vent of a plurality of cyclones and control the internal pressure of each the plurality of fluidized bed reactor;
 a lower loop seal which interconnects lower portions of the two fluidized bed reactors and is injected with a fluidizing gas;
 an upper loop seal which interconnects sides of the two fluidized bed reactors and is injected with a fluidizing gas; and
 a control part which controls each the pressure control valves and makes a pressure difference, that is, a difference between the internal pressure of the two fluidized bed reactors to be over a predetermined pressure difference, thereby circulating solids between the two fluidized bed reactors.

2. The fluidized bed solid circulation system using pressure difference of the claim 1, wherein the lower loop seal comprises: a plenum which is equipped with a partition and is injected with a fluidizing gas from opposite sides; a distributor which is positioned at an upper portion of the plenum and has a plurality of pores, thereby permitting the fluidizing gas to move up to the upper portion; and a connection pipe which is positioned at an upper end of the distributor and each end portion of which is connected between the two fluidized bed reactors, thereby conveying the fluidizing gas to each the two fluidized bed reactors.

3. The fluidized bed solid circulation system using pressure difference of the claim 2, wherein the upper loop seal comprises: a solid inlet pipe which flows in solids from one of the two fluidized bed reactor; a solid outlet pipe which flows out solids to the other; and a U shaped pipe which is positioned between the solid inlet pipe and the solid outlet pipe, and there is a height difference between a solid inlet height of the solid inlet pipe and a solid outlet height of the solid outlet pipe.

4. A fluidized bed reaction system having a solid circulation system using pressure difference comprising:
 a first fluidized bed reactor which has a first fluidizing gas injection part to be injected with a fluidizing gas;
 a second fluidized bed reactor which has a second fluidizing gas injected part to be injected with a fluidizing gas;
 a first cyclone to which solids and gases are conveyed from the first fluidized bed reactor and which separates the conveyed solids and gases;
 a second cyclone to which solids and gases are conveyed from the second fluidized bed reactor and which separates the conveyed solids and gases;
 a first pressure control valve which is formed on a gas vent of the first cyclone and controls the internal pressure of the first fluidized bed reactor;
 a second pressure control valve which is formed on a gas vent of the second cyclone and controls the internal pressure of the second fluidized bed reactor;
 a lower loop seal which interconnects lower portions of the first fluidized bed reactor and the second fluidized bed reactor and is injected with a fluidizing gas;
 an upper loop seal which interconnects sides of the first fluidized bed reactor and the second fluidized bed reactor and is injected with a fluidizing gas; and
 a control part which controls each of the first pressure control valve and the second pressure control valve to make an internal pressure difference, that is, a difference between the internal pressure of the first fluidized bed reactor and the second fluidized bed reactor to be over a predetermined pressure difference, thereby circulating the solids between the first fluidized bed reactor and the second fluidized bed reactor.

5. The fluidized reaction bed system having a solid circulation system using pressure difference of the claim 4, wherein the predetermined pressure difference is $\Delta P_2$ represented by Formula 1 as below:

$$\Delta P_2 = \Delta P_1 = H_4(1-\varepsilon_{mf})(\rho_s - \rho_g)\frac{g}{g_c}, \qquad \text{[Formula 1]}$$

where $H_4$ is a difference between a solid bed height ($H_2$) of the second fluidized bed reactor and a solid bed height ($H_1$) of the first fluidized bed reactor, $\Delta P_1$ is a pressure drop (pressure difference) [Pa] by the solid bed, corresponding to a height ($H_2$) of the second fluidized bed reactor, $\varepsilon_{mf}$ is a voidage [–] of the solid bed in the minimum fluidized bed condition, $\rho_s$ is a solid density [kg/m$^3$], $\rho_g$ is a gas density [kg/m$^3$], $g_c$ is a constant of gravitational acceleration, 1[(kgm)/(Ns$^2$)], and g is gravitational acceleration, 9.8 [m/s$^2$].

6. The fluidized bed reaction system having a solid circulation system using pressure difference of the claim 5, wherein the lower loop seal comprises: a plenum which is equipped with a partition and is injected with a fluidizing gas from opposite sides; a distributor which is positioned at an upper portion of the plenum and has a plurality of pores, thereby permitting the fluidizing gas to move up to the upper portion; and a connection pipe which is positioned at an upper end of the distributor and each end portion of which is connected between the first fluidized bed reactor and the second fluidized bed reactor, thereby conveying the fluidizing gas to each of the first fluidized bed reactor and the second fluidized bed reactor.

7. The fluidized bed reaction system having a solid circulation system using pressure difference of the claim 6, wherein the upper loop seal comprises: a solid inlet pipe which flows in solids from the second fluidized bed reactor; a solid outlet pipe which flows out solids to the first fluidized bed reactor; and a U shaped pipe which is positioned between the solid inlet pipe and the solid outlet pipe, and there is a height difference between a solid inlet height of the solid inlet pipe and a solid outlet height of the solid outlet pipe.

8. The fluidized bed reaction system having a solid circulation system using pressure difference of the claim 7, the solids are circulated from the first fluidized bed reactor to the second fluidized bed reactor through the lower loop seal, and recirculated from the second fluidized bed reactor to the first fluidized bed reactor through the upper loop seal.

9. The fluidized bed reaction system having a solid circulation system using pressure difference of the claim 8, the particle density of solids inside the first fluidized bed reactor is greater than that of solids inside the second fluidized bed reactor.

10. The fluidized bed reaction system having a solid circulation system using pressure difference of the claim 9, the first fluidized bed reactor is configured to be an oxidation reactor, and the second fluidized bed reactor is configured to be a reduction reactor.

11. A fluidized bed solid circulation method using pressure difference between a fluidized bed reaction system comprising: first and second fluidized bed reactors into which a fluidizing gas is flown respectively; first and second cyclones which separate gases and entrained solids discharged from each the first and second fluidized bed reactors; first and second pressure control valves which are formed on gas vents of each the first and second cyclones and control the internal pressure of each the first and second fluidized bed reactors; a lower loop seal which interconnects lower portions of the first and second fluidized bed reactors and is injected with a fluidizing gas; and an upper loop seal which interconnects sides of the first fluidized bed reactor and the second fluidized bed reactor and is injected with a fluidizing gas, wherein the solid circulation method circulates solids inside the first and second fluidized bed reactors by using pressure differences and comprises the steps of:

inserting solid particles into the first and second fluidized bed reactors and the lower and upper loop seals on the same internal pressure condition in the first fluidized bed reactor and the second fluidized bed reactor;

injecting a fluidizing gas into the first and second fluidized bed reactors and the lower and upper loop seals;

controlling the internal pressure of the first fluidized bed reactor to be greater than that of the second fluidized reactor by that a control part controls the first pressure control valve and the second pressure control valve;

rendering a pressure difference of the first fluidized bed reactor and the second fluidized bed reactor to reach a predetermined pressure difference; and circulating the solids between the first fluidized bed reactor and the second fluidized bed reactor.

12. The fluidized bed solid circulation method using pressure difference of the claim 11, wherein in the step of reaching a predetermined pressure difference, a height of a solid bed in the second fluidized bed reactor reaches a height of a solid inlet pipe ($H_{UL}$), and a difference ($H_4$) between a solid bed height of the first fluidized bed reactor and a solid bed height of the second fluidized bed reactor reaches a difference between a height of a connection portion where a solid inlet pipe of an upper loop seal is connected to the second fluidized bed reactor, and a height of a connection portion where a solid outlet pipe of the upper loop seal is connected to the first fluidized bed reactor.

13. The fluidized bed solid circulation method using pressure difference of the claim 12, wherein the predetermined pressure difference is $\Delta P_2$ represented by Formula 1 as below:

$$\Delta P_2 = \Delta P_1 = H_4(1 - \varepsilon_{mf})(\rho_s - \rho_g)\frac{g}{g_c}, \quad \text{[Formula 1]}$$

where $H_4$ is a difference between a solid bed height of the first fluidized bed reactor and a solid bed height of the second fluidized bed reactor, $\Delta P_1$ is a pressure drop (pressure difference) [Pa] by the solid bed, corresponding to a height ($H_2$) of the second fluidized bed reactor, $\varepsilon_{mf}$ is a voidage [–] of the solid bed in the minimum fluidized bed condition, $\rho_s$ is a solid density [kg/m³], $\rho_g$ is a gas density [kg/m³], $g_c$ is a constant of gravitational acceleration, 1[(kgm)/(Ns²)], and g is gravitational acceleration, 9.8 [m/s²].

14. The fluidized bed solid circulation method using pressure difference of the claim 13, wherein in the step of circulating the solids, the solids are circulated from the first fluidized bed reactor to the second fluidized bed reactor through the lower loop seal, and recirculated from the second fluidized bed reactor to the first fluidized bed reactor through the upper loop seal.

15. The fluidized bed solid circulation method using pressure difference of the claim 14, wherein a reaction for increasing the density of the solid particles occurs in the first fluidized bed reactor, while a reaction for decreasing the density of the solid particles occurs in the second fluidized bed reactor.

\* \* \* \* \*